United States Patent Office 3,513,119
Patented May 19, 1970

3,513,119
FLAME-RETARDANT COMPOSITIONS FOR PLASTICS COMPRISING ETHYLENE PHOSPHITE AND A CHLORINATED HYDROCARBON
Joseph Frederick Cannelongo, Piscataway, N.J., assignor to American Cyanamid Company, Stamford, Conn., a corporation of Maine
No Drawing. Continuation-in-part of application Ser. No. 521,536, Jan. 19, 1966. This application Dec. 20, 1968, Ser. No. 785,747
Int. Cl. C08f 45/52
U.S. Cl. 260—28.5
10 Claims

ABSTRACT OF THE DISCLOSURE

Flame-retardant compositions comprising a combination of ethylene phosphite and a chlorinated hydrocarbon and polymers containing said compositions are disclosed.

CROSS-REFERENCES TO RELATED APPLICATIONS

This application is a continuation-in-part of my copending application Ser. No. 521,536, filed Jan. 19, 1966, now abandoned.

BACKGROUND OF THE INVENTION

The use of certain additives for the purpose of reducing the flammability of various thermoplastic polymers is well known to those skilled in the art. Among the additives currently employed for such a use are various specific types of phosphorus-containing compounds. These phosphorus compounds are generally used either alone or in combination with other materials such as aliphatic or aromatic antimonous compounds. Certain analogous materials such as chlorostyrene copolymers, chlorinated paraffin waxes, alone or with antimony oxide, are also known to be effective flame-retardants for resinous materials. One drawback of these known compounds and combinations of compounds, however, has been the fact that generally large amounts, i.e. upwards of 35%, of the additive must be incorporated into the polymer in order to render it reasonably flame-retardant. Such large quantities of additive ofttimes deleteriously alter the properties of the polymer and moreover, some additives tend to crystallize or oil out of the polymer after a relatively short time of incorporation therein.

I have now found that superior flame-retarding properties can be imparted to thermoplastic polymers by incorporating into the polymer a synergistic combination or mixture of a chlorinated hydrocarbon material and ethylene phosphite. The novel synergistic combination is utilized at a total concentration which is less than the amounts at which either component may function independently in a manner similar to the combination in the same polymer to which the combination is added.

The results shown by the use of the above-mentioned flame-retardant combination are surprising and unexpected in that the combination provides a greater degree of flame-retardancy than one would expect from the results shown by the use of the components individually, i.e. they are synergistic. Moreover, the combination produces a greater degree of flame-retardancy at lower concentrations in the polymer than could heretofore be achieved utilizing known materials. Additionally, the effectiveness of the combination is achieved in the absence of any third ingredient, such as antimony compounds which were previously believed to be necessary. This synergism, moreover, does not appear to be limited to specific combinations, but is broadly applicable to any combination of a chlorinated hydrocarbon material and ethylene phosphite.

As mentioned above, the first critical component of my novel flame-retardant compositions is a chlorinated hydrocarbon material. Although any chlorinated hydrocarbon material tends, to some extent, to be effective, I have found that those which are stable to the processing conditions of thermoplastic polymers when in combination therewith are more preferable. That is to say, a critical limitation in regard to the chlorinated hydrocarbon materials is that they should have a boiling point of at least about 200° C., in that those of a lower boiling point tend to vaporize out of the polymer when the polymer is ultimately processed or fabricated for consumer production.

A further critical limitation in regard to the chlorinated hydrocarbon materials utilized herein is that they must contain at least about 40% of combined chlorine, preferably from about 40% to 80%, by weight, based on the weight of the compound per se. Percentages of combined chlorine above 80% are tolerable but impractical, while at percentages lower than about 40%, the effectiveness of the combination is materially lowered. The chlorinated hydrocarbon materials may be used in concentrations ranging from about 0.2% to about 15.0%, by weight, based on the weight of the polymer to which it is added, preferably from about 0.5% to about 12.0%, same basis.

Examples of useful chlorinated hydrocarbon materials include compounds such as perchloropentacyclodecane, hexachlorocyclopentadiene, hexachlorobenzene; the polychlorinated monocyclic aromatic hydrocarbons such as 2,3,5,6-tetrachloro-o, m or p-xylene, 2,5-dichloro-o, m or p-xylene, $\alpha,\alpha$-dichloro-o, m or p-xylene, $\alpha,\alpha'$-hexachloro-o, m or p-xylene; various commercially available chlorinated biphenyls and polyphenyls which range in consistency from oily liquids to fine, white crystals to hard, transparent resins. These biphenyls and polyphenyls are non-oxidizing, have a low volatility and are non-corrosive. They are not hydrolyzed by water, alkalies or acids, are insoluble in water, glycerine and glycols and distill at 215° C. to 450° C. The crystalline materials have melting points up to 290° C. and the resins have softening points up to 105° C.

A further class of applicable chlorinated hydrocarbon materials useful herein are the chlorinated paraffin waxes containing between about 40% to 80% combined chlorine and averaging from 18–36 carbon atoms. These materials are chlorinated soft or slack waxes and are disclosed in one or more of the following U.S. Pats. Nos. 2,924,532, 2,962,464 and 3,194,846, which patents are hereby incorporated herein by reference.

The second critical component of my novel flame-retardant compositions is ethylene phosphite. Ethylene phosphite is suitable herein since it is stable to most of the processing conditions to which the polymers into which it is incorporated are subjected. It is a commercially available compound having a molecular weight of 108, a phosphorus content of 28.7%, and a boiling point of 150–160° C. at 0.1 mm. It is opalescent white in color and is represented by the formula (I) 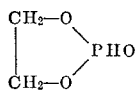

The ethylene phosphite may be incorporated into the polymeric material in concentrations ranging from about 0.1% to about 15.0%, preferably, 0.2%–12.0%, by weight, based on the weight of the polymer to which it is added.

In general, any thermoplastic polymeric material may be rendered flame-retardant by the incorporation therewith of the above-identified flame-retardant combinations. Generally, however, the vinyl type polymers, wherein a monomeric material is polymerized, by known methods, e.g. by use of free-radical generating catalysts, irradiation, anionic and cationic catalysts etc. are those preferred. Examples of the vinyl type polymers which may be used to form my novel compositions are the polyvinyl acetates, polyvinylbutyral, butadiene copolymers, e.g. acrylonitrile-butadiene-styrene copolymers, the polyacrylonitriles, polybutadiene, polyaldehydes such as polyoxymethylene, and the like. Additionally and even more preferably, one may incorporate the flame-retardant synergistic combinations mentioned above into such polymers as the styrene polymers, i.e. polystyrene, α-methyl styrene polymers etc. the α-olefin polymers, such as the homopolymers and copolymers etc. containing, as the major constituent, thereof, ethylene, propylene, including polyethylene, polypropylene and the like and the acrylate and methacrylate homopolymers and copolymers produced from monomers having the formula (II) 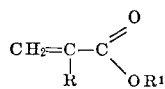

wherein R is hydrogen or a methyl radical and R¹ is hydrogen or an alkyl radical having from 1 to 6 carbon atoms, inclusive. Examples of monomers represented by Formula II include acrylic acid, methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate and their corresponding alkyl methacrylates, etc.

Also such polymers as the nylons, e.g. adipic acid-hexamethylenediamine reaction products; the cellulosics such as cellulose acetate (and/or butyrate, etc.), cellulose nitrate; the polycarbonates, i.e. phosgene-Bispenol A reaction products; the so-called impact polymers, i.e. rubber-polymer blends such as blends of polystyrene with 5–10% of butadiene-styrene, etc. and the like may be made flame-retardant by the incorporation therein of the ethylene phosphite-chlorinated hydrocarbon synergistic combinations discussed hereinabove.

Examples of other monomers which may be used to form the thermoplastic vinyl polymers encompassed by the present invention, polymerized either singularly or in combination with each other or with the other compounds set forth hereinabove, are such monomers as the unsaturated ethers, e.g., ethyl vinyl ether, diallyl ether, etc. the unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; the unsaturated ketones, e.g., methyl vinyl ketone, methyl allyl ketone, etc.; methylene malonic esters, e.g., methylene methyl malonate, etc. and the like.

Other examples of polymers that may be employed are those of monomers set forth, for example, in U.S. Pat. No. 2,510,503, issued June 6, 1950.

The production of thermoplastic resin compositions which are flame-retardant is of considerable commercial importance in that such articles as castings, moldings, foamed or laminated articles, etc. are required, or at least desired, to be resistant to fire and flame and to possess the ability to endure heat without deterioration. Typical illustrations of applications of such compositions include castings for live electrical contacts which should not be ignited by flame or sparks, structural members such as pipes, wall coverings, wall paneling, windows, etc. and such items as ash trays, waste baskets, fibers and the like.

The novel flame-retardant combinations claimed herein may be added to the various polymers, as such, or as individual components, by any known method. That is to say, the flame-retardant components may be added to the polymer as such or in combination by (1) milling the polymer and the components on, for example, a two-roll mill, in a Banbury mixer, etc. by (2) molding the components and the polymer simultaneously, by (3) extruding the polymer and components or by (4) merely blending all the materials together in powder or liquid form and thereafter forming the desired ultimate product. Additionally, the flame-retardant combination may be added during the production of the polymer, i.e. during the monomer polymerization, provided, however, that the catalyst, etc. other conditions and other ingredients of the polymerization system are inert thereto.

It is also within the scope of the instant invention to incorporate such ingredients as plasticizers, dyes, pigments, heat and light stabilizers, antioxidants, antistatic agents, photochromic materials and the like into the polymeric flame-retarded polymer compositions claimed herein.

The following examples are set forth for purposes of illustration only and are not to be construed as limitations on the present invention except as set forth in the appended claims. All parts and percentages are by weight unless otherwise specified.

Any appropriate flame-retardance test may be used to determine the flame-retardant properties of any specific combination of ethylene phosphite and chlorinated hydrocarbon material. One test I have found to be reasonably efficient is a modified version of that test identified as ASTM–D–635–56T. The specifications for this test are: a specimen, 5″ in length, 0.5″ in width and 0.045″ in thickness is marked at the 1″ and 4″ lengths and is then supported with its longitudinal axis horizontal and its transverse axis inclined at 45° to the horizontal. A Bunsen burner with a 1″ blue flame is placed under the free end of the strip and is adjusted so that the flame tip is put in contact with the strip. At the end of 30 seconds, the flame is removed and the specimen is allowed to burn. If the specimen does not continue to burn after the first ignition, it is immediately recontacted with the burner for another 30 seconds. If, after the two burnings, the strip is not burned to the 4″ mark, the specimen is designated as "self-extinguishing." If the specimen is not burned to the 1″ mark it is designated as "non-burning." In the modified test, the specimen is 20 mils in thickness rather than the prescribed 0.045″.

EXAMPLE 1

To 100 parts of polypropylene are added 5 parts of ethylene phosphite and 5 parts of chlorinated paraffin wax containing 70% chemically combined chlorine (empirical formula $C_{24}H_{29}Cl_{21}$). The resultant mixture is placed in a suitable blender and dry-blended for 10 minutes. The blended product is then transferred to a melt-index apparatus (see ASTM–D–1238–62T) which is preheated to 250° C. Following one minute of aging, a 2.2 kg. weight is placed on the plunger and an extrudate of 6–8 inches in length is obtained. This specimen is marked and tested according to the above-enumerated flame-retardance test. The results are set forth in Table I, below.

Various other flame-retardant combinations are then incorporated into various other resins according to Example 1 and comparisons are made between the resultant compositions and control compositions. These results are also set forth in Table I, below.

5. A flame-retarded composition according to claim 4 wherein said thermoplastic polymer is a polyolefin.
6. A flame-retarded composition according to claim 4 wherein said thermoplastic polymer is polyethylene.

TABLE I

| Example | Chlorinated hydrocarbon | Percent | Ethylene phosphite, percent | Polymer | Flame test results |
|---|---|---|---|---|---|
| 1 | Chlorinated paraffin wax, 70% combined chlorine | 5 | 5 | Polypropylene | Passed. |
| 2 | do | 10 | | do | Failed. |
| 3 | | | 15 | do | Do. |
| 4 | Hexachlorobenzene | 5 | 5 | Polystyrene | Passed. |
| 5 | do | 10 | | do | Failed. |
| 6 | Perchlorocyclopentadiene | 7 | 7 | Polyethylene | Passed. |
| 7 | do | 15 | | do | Failed. |
| 8 | Clear polyphenyl resin, distills 280–335° C., softens 98–105.5° C | 3 | 3 | Nylon [1] | Passed. |
| 9 | do | 10 | | do | Failed. |
| 10 | 2,3,5,6-tetrachloro-p-xylene | 7.5 | 7.5 | Butadiene/styrene (25/75) | Passed. |
| 11 | do | 15 | | do | Failed. |
| 12 | Hexachlorocyclopentadiene | 5 | 5 | Poly(methylmethacrylate) | Passed. |
| 13 | do | 10 | | do | Failed. |
| 14 | Chlorinated paraffin wax, 40% combined chlorine | 4.5 | 4.5 | Polyvinyl butyral | Passed. |
| 15 | do | 10 | | do | Failed. |
| 16 | Yellow, viscous polyphenyl oil distills 365–390° C., pours 10° C., refractive index [2] 1.639–1.641. | 7.5 | 7.5 | Polybutadiene | Passed. |
| 17 | do | 15 | | do | Failed. |
| 18 | α,α-Dichloro-m-xylene | 6.5 | 6.5 | Low density polyethylene | Passed. |
| 19 | do | 13 | | do | Failed. |
| 20 | Chlorinated paraffin wax, 50% combined chlorine | 5 | 5 | Polyoxymethylene | Passed. |
| 21 | do | 10 | | do | Failed. |
| 22 | White, polyphenyl powder, distills 435–450° C., softens 150–170° C | 5 | 5 | Cellulose acetate | Passed. |
| 23 | do | 10 | | do | Failed. |

[1] Adipic acid—hexamethylenediamine reaction product.
[2] D—line at 20° C.

Ethylene phosphite alone (15%) also failed the flame test when added to polystyrene, polyethylene, nylon, butadiene-styrene (25/75), poly(methyl methacrylate), polyvinyl butyral, polybutadiene, low-density polyethylene, polyoxymethylene and cellulose acetate.

I claim:
1. A flame-retardant composition comprising a combination of (1) from about 0.2% to about 15% of a chlorinated hydrocarbon containing from about 40–80% of combined chlorine and having a boiling point of at least 200° C. and (2) from about 0.1% to about 15% of ethylene phosphite, said percentages being by weight based on the weight of the polymer to which said composition is added.
2. A flame-retardant composition according to claim 1 wherein (1) is a chlorinated paraffin wax.
3. A flame-retardant composition according to claim 1 wherein (1) is a polychlorinated cyclic hydrocarbon.
4. A flame-retarded composition comprising a thermoplastic polymer having incorporated therein a flame-retarding amount of the composition of claim 1, the sum of the amounts of components (1) and (2) being less than those amounts at which either component (1) or (2) functions individually in a flame-retarding manner similar to the combination in the same polymer to which the combination is added.

7. A flame-retarded composition according to claim 4 wherein said thermoplastic polymer is polypropylene.
8. A flame-retarded composition according to claim 4 wherein said thermoplastic polymer is polystyrene.
9. A flame-retarded composition according to claim 4 wherein said thermoplastic polymer is poly(methyl methacrylate).
10. A flame-retarded composition according to claim 4 wherein said chlorinated hydrocarbon is a chlorinated paraffin wax.

References Cited
UNITED STATES PATENTS
| | | |
|---|---|---|
| 3,333,970 | 8/1967 | Green. |
| 3,422,047 | 1/1969 | Cannelongo _____ 260—28.5 |
| 3,422,048 | 1/1969 | Cannelongo _____ 260—28.5 |

FOREIGN PATENTS
| | | |
|---|---|---|
| 982,208 | 2/1965 | Great Britain. |

MORRIS LIEBMAN, Primary Examiner

T. MORRIS, Assistant Examiner

U.S. Cl. X.R.

106—15; 252—8.1; 260—45.7, 45.8